United States Patent [19]

Palm

[11] Patent Number: 4,748,534
[45] Date of Patent: May 31, 1988

[54] DEVICE FOR ESTABLISHING BETWEEN CONDUCTORS A GALVANIC CONNECTION, WHICH IS BLOCKED FOR THE TRANSMISSION OF ELECTROMAGNETIC RADIATION

[75] Inventor: Michiel Palm, 's-Hertogenbosch, Netherlands

[73] Assignee: Staat der Nederlanden (Staatsbedrijf der Posterijen, Telegrafie en Telefonie), The Hague, Netherlands

[21] Appl. No.: 8,774

[22] Filed: Jan. 30, 1987

[30] Foreign Application Priority Data

Feb. 6, 1986 [NL] Netherlands ..................... 8600288

[51] Int. Cl.$^4$ ........................... H01C 7/12; H02H 1/04
[52] U.S. Cl. ..................................... 361/119; 361/120
[58] Field of Search ................. 361/56, 119, 120, 129

[56] References Cited

U.S. PATENT DOCUMENTS

| | | | |
|---|---|---|---|
| 3,793,535 | 2/1974 | Chowhurdi | 361/56 |
| 4,021,759 | 5/1977 | Campi | 361/119 |
| 4,180,843 | 12/1979 | Hagedoorn et al. | 361/119 |
| 4,262,317 | 4/1981 | Baumbach | 361/119 |
| 4,563,720 | 1/1986 | Clark | 361/119 |
| 4,677,518 | 6/1987 | Hershfield | 361/120 |
| 4,698,722 | 10/1987 | Kron | 361/119 |

FOREIGN PATENT DOCUMENTS

| | | |
|---|---|---|
| 1541709 | 4/1970 | Fed. Rep. of Germany . |
| 7037977 | 10/1971 | Fed. Rep. of Germany . |
| 3048170 | 8/1981 | Fed. Rep. of Germany . |
| 2375742 | 7/1978 | Netherlands ............ 361/119 |

OTHER PUBLICATIONS

Eltromagnetische Raumabschirmungen, Von Ulrich Pohl, vol. 100, #3, Mar. 1983, Wlektrotechnik und Maschienbau, Wien, Austria.

Primary Examiner—L. T. Hix
Assistant Examiner—David Porterfield
Attorney, Agent, or Firm—Frishauf, Holtz, Goodman & Woodward

[57] ABSTRACT

Device for establishing such a galvanic connection between conductors of a first batch and conductors of a second batch that on the one hand signal transmission between the two batches can take place undisturbed, and on the other hand transmission consequent on inducing electro-magnetic radiation will be blocked in two respects. High voltage induced in the conductors of the first batch consequent on high-energetic radiation, which manifests itself as a pulse, is reduced in stages to a relatively low residual voltage on the conductors of the second batch. Besides voltages induced either in the conductors of the first batch or in the conductors of the second batch, consequent on electromagnetic radiation having a signal character, are strongly reduced, in such a way that the conductors of the relevant other batch (either the second or the first) will not cause a detectable corresponding radiation. For that purpose an LD-filter configuration with one or two T-sections connected in cascade has been connected between each pair of corresponding conductors. In one of these T-sections a coil, which also forms part of a high-voltage reducing section, has been utilized. The device is mounted in a housing, which blocks electromagnetic radiation and can be fixed to a wall of a Faraday cage room in such a way that an opening in that wall will be closed. In this manner electric conductors extending to the interior of the Faraday cage room can be connected, in the desired way, to electric conductors establishing a connection with the outer world.

6 Claims, 2 Drawing Sheets

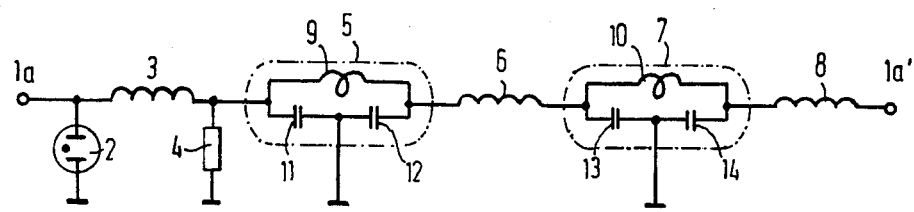
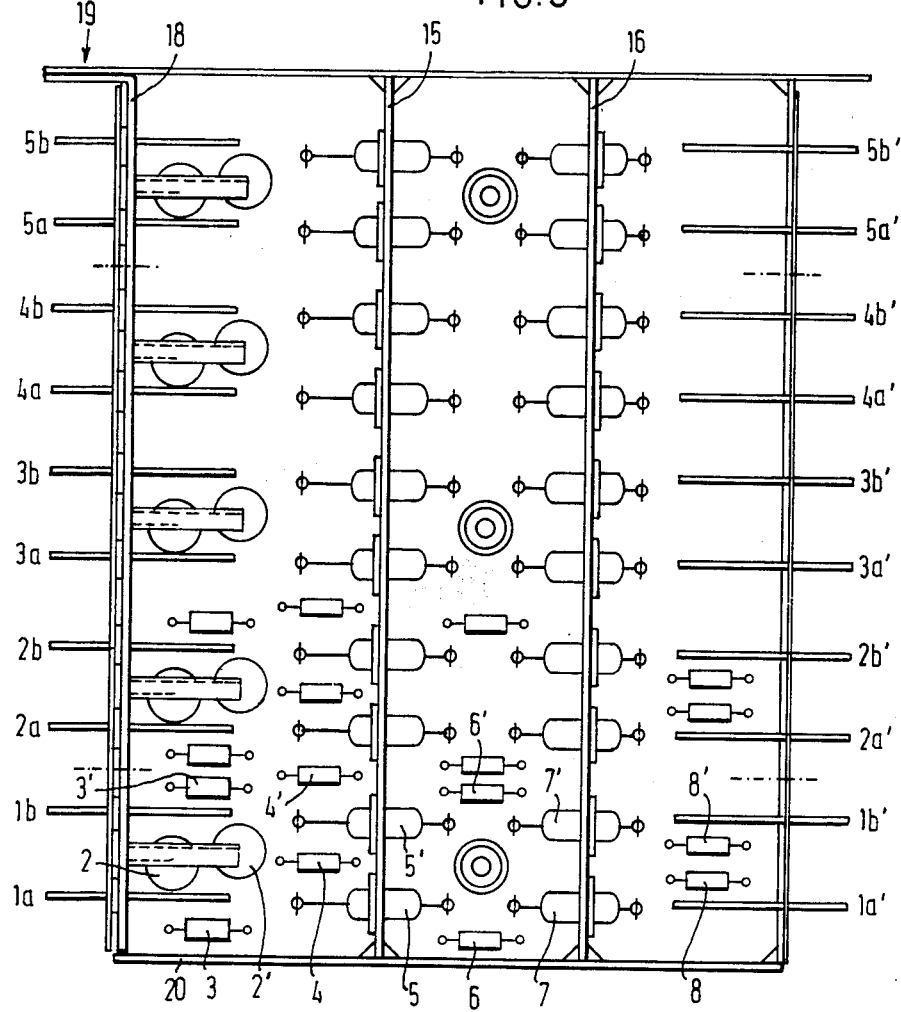

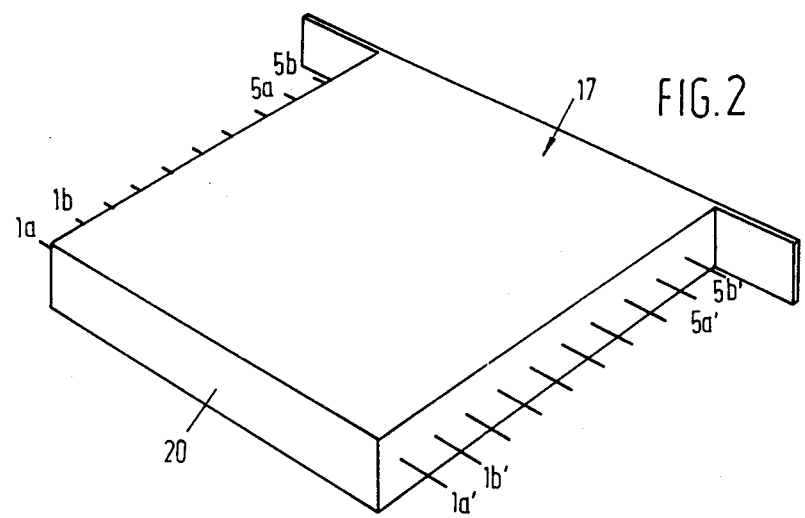
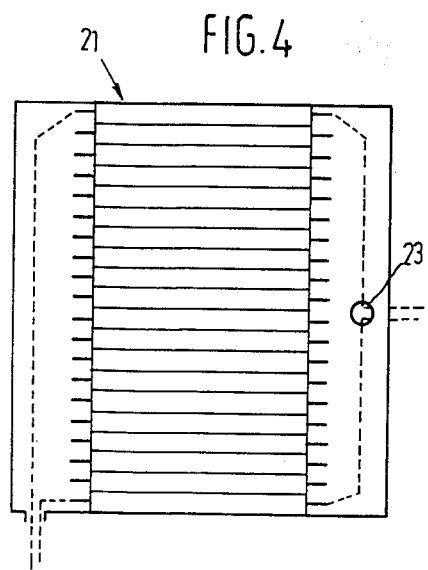
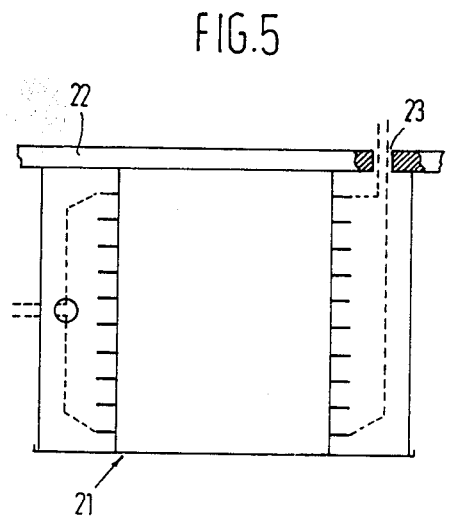

DEVICE FOR ESTABLISHING BETWEEN CONDUCTORS A GALVANIC CONNECTION, WHICH IS BLOCKED FOR THE TRANSMISSION OF ELECTROMAGNETIC RADIATION

BACKGROUND OF THE INVENTION

1. Field of the Invention

The invention relates to a device for establishing a galvanic connection between one or more conductors forming a first batch and one or more conductors forming a second batch, a transmission, consequent on electromagnetic radiation, between these two batches being purposefully blocked.

A device of the aforesaid type is used for example in combination with a screened room of the sort defined as the "Faraday cage", and containing communication equipment connected to the outer world of said room via electric conductors. Such conductors have been led through a wall of the "cage room" by means of such a construction that the desired screening effect of this cage room will not be affected in an inadmissible way.

2. State of the Art

A device of the sort described above and having connected between each pair of corresponding conductors of the first batch and the second batch a voltage-dependent $\pi$-filter section with a coil connected in its longitudinal branch, and provided with an electrically conducting partition transversely to the direction of transmission is known from the Netherlands Pat. No. 173226.

The main purpose of a known device of the sort mentioned above is to protect communication equipment contained in a Faraday cage room against overvoltage in an economical way. Such overvoltage can be caused for instance an electromagnetic pulse (EMP) or by lightning. A high or high-energetic voltage induced in a conductor of for example the first batch by such a pulse is conducted to earth by the $\pi$-filter section in stages and via the wall of the cage, so that the residual voltage or residual energy developed on the corresponding conductor of the second batch will be reduced to below a value admissable for the equipment connected to that conductor and contained in the cage room. A protection as described above appears to be insufficient for certain vulnerable communication equipment. Moreover, such a known device does not meet the necessary requirements with regard to: blocking a transmission, via the electric conductors, of voltages induced inside or outside the Faraday cage room consequent on electromagnetic radiation having a signal character; and transmission (impedance matching, attenuation etc.) of analog and/or digital signals.

SUMMARY OF THE INVENTION

The general object of the present invention is to improve a device of the aforesaid known type (also called lead-through filger) and to complete the same with respect to the aspects mentioned under 2. More in particular the object of this invention is to provide a construction with which it will be possible to meet the following requirements:

a. protection of equipment contained in a Faraday cage room againsts overvoltage as caused by EMP or lightning;

b. blocking voltages in a conductor (cable conductor) induced consequent on electromagnetic radiation having a signal character, so that a relevant "outer world conductor" respectively "internal conductor" will not be able to radiate a corresponding signal, when the inducing electro-magnetic radiation in question is offered internal (in other words inside) respectively external (in other words outside) the Faraday cage room;

c. undisturbed transmission of desired analog and digital signals.

A device according to the invention is characterized in that a coil as mentioned before forms part of a frequency-dependent filter section with a transverse branch comprising a capacitor, which is mounted in said transverse partition in such a way that electromagnetic radiation is blocked, and also forms part of a $\pi$-filter section with an HF-coil in its longitudinal branch; and in that the transverse partition is mounted in a metal housing in such a way that electromagnetic radiation is blocked.

In order to be able to meet the specific requirements described under b. in an economical way a device according to the invention is further characterized in that a second frequency-dependent filter section similar to the former frequency-dependent filter section and connected in cascade with it, is connected between a relevant pair of connectors, the capacitor of this second frequency-dependent filter section being mounted in a separate transverse partition in such a way that electromagnetic radiation is blocked, which partition, in its turn, is mounted in the metal housing in such a way that electromagnetic radiation is blocked.

It appears to be possible to dispose a compound lead-through filter according to the invention within the same space as in which a lead-through filter according to the known technique described under 2. is housed. Besides the requirements regarding attenuation and reflection attenuation are met over specified frequency ranges.

SHORT DESCRIPTION OF THE DRAWING

To elucidate the invention an illustrative embodiment of the same will be described hereinafter with reference to the drawing in which:

FIG. 1 shows a diagram of the electric problem of an embodiment of a lead-through filter according to the invention;

FIG. 2 is a representation of a perspective view of a modular unit in the shape of a flat box closed on all sides and in which a number (ten) of lead-through filters according to the invention are housed;

FIG. 3 is a diagrammatic top view of the modular unit according to FIG. 2 when the cover of the box has been removed;

FIG. 4 is a diagram to illustrate the way in which a number (twenty) of the modular units according to the FIGS. 2 and 3 have been mounted one on top of the other in a casing; and FIG. 5 shows a diagrammatic top view to illustrate the way in which a casing according to FIG. 4 can be fixed to the outside of a wall of a Faraday cage through which a number (twenty times ten) of transmission lines (conductors) have been led.

REFERENCES

Netherlands Pat. No. 173226. (=U.S. Pat. No. 4,180,843)

DESCRIPTION OF THE EMBODIMENTS

The diagram shown in FIG. 1 is illustrative of an embodiment of a device, more in particular a lead-through filter, according to the invention. The lead-through filter shown is connected on the one hand to a first connector 1a, on the other hand to a second connector 1a'. The connector 1a, respectively 1a' is meant to be galvanically connected to a first, respectively a second, corresponding to the first, transmission line. The components 2, 3 and 4, more in particular a first voltage-dependent cross impedance, such as for example a gas-discharge tube, a coil and a second voltage-dependent cross impedance, such as for example a varistor, form part of a lead-through filter known from the above-mentioned Netherlands Pat. No. 173226. The lead-through filter shown further comprises a first lead-through component 5, a coil 6, a second lead-through component 7 and a coil 8. Both the first and the second lead-through component are of a design known in itself and form a "low-pass" $\pi$-filter section with an HF-coil 9 or 10, respectively in the relevant longitudinal branch and with the capacitors 11, 12 or 13, 14, respectively in the relevant transverse branches. The components 2, 4, 5 and 7 are connected to earth as diagrammatically represented in FIG. 1.

The configuration described in what precedes can be dimensioned in such a way that the components 3, 11, 12 and 6 (partly) respectively 6 (partly), 13, 14 and 8 form two low-pass T-filter sections connected in cascade, this combination having a crossover frequency at c. 600 kHz and an attenuation of at least 120 dB/octave. Owing to the relevant two lead-through components 5 and 7 it can be ensured that in a band of 6 MHz up to c. 1 GHz an attenuation of -100 dB will be introduced.

As a rule each "wire path" of a balanced two-wire transmission circuit comprises a lead-through filter with the configuration of FIG. 1 as described in what precedes. A modular unit as shown in FIG. 2 forms a housing, which blocks electromagnetic radiation, and is capable of containing five of such "two-wire lead-through filters", which can be connected via the relevant connectors 1a, 1b, and 1a' 1b' between transmission lines of a first batch and transmission lines of a second batch. For the sake of completeness it is remarked that when utilizing a lead-through filter according to the invention, the side where the gas-discharge tubes are, faces the environment where an overvoltage, such as an EMP or lightning, can be expected.

FIG. 3 is illustrative of the way in which a modular unit according to the FIG. 2 has been adapted. In the FIGS. 1 and 3 the same components are designated by the same reference symbols. In FIG. 3 all the lead-through filter componets have been diagrammatically represented for only two two-wire circuits, to wit 1a, 1a', 1b, 1b' and 2a, 2a', 2b, 2b'. The filter components of the "one-wire circuit" 1b, 1b' in this figure are designated by 2', 3', 4', 5', 6', 7' and 8'.

FIG. 3 further shows that the lead-through components such as 5 and 5', respectively 7 and 7' are mounted in a partition 15 respectively 16 made of electrically conductive material and located transversely to the direction of transmission. More in particular these lead-through components are fixed in the relevant partition in such a way that electromagnetic radiation is blocked. In this case the "earth side" electrodes of the relevant capacitors such as 11, 12 respectively 13, 14 are electrically connected to the partitions 15 respectively 16. Besides, each of these partitions is galvanically connected to the bottom wall, the cover wall and two upright walls of the housing as designated in its generality by 17 in FIG. 2, in such a way that electromagnetic radiation is blocked. The cover wall (not shown in FIG. 3) can be removed from the box portion of the modular unit, of which portion a top view is shown in FIG. 3. To obtain a connection, capable of blocking electromagnetic radiation, between the partitions 15 and 16 and said cover wall, this wall has been provided, near where each of these partitions are disposed, with a resiliently supporting strip of brass lamella, which is galvanically connected to that cover wall. All the gas-discharge tubes occurring in a modular unit are galvanically connected "on the earth side" to an earth strip 18 with a relatively large conductivity. Such an earth strip has been adapted to be galvanically connected to an earth rail at a place which is designated by 19 in FIG. 3. Such an earth rail has been fixed round the wall of the Faraday cage room on which the relevant modular unit has to be mounted. By galvanically connecting the gas-discharge tubes to a common earth strip in the above-mentioned way, it is prevented that in the case of an overvoltage such as EMP or lightning, extremely high voltages will arise between the wall of the Faraday cage and the remotely located wall portion 20 of the filter housing.

FIG. 4 diagrammatically shows the way in which a number, for example twenty, of the modular units such as 17 have been mounted one on top of the other in a metal casing 21. In this figure the wall parts such as 20 of the relevant filter housings such as 17 are looked at.

FIG. 5 diagrammatically shows (by means of a top view) the way in which the casing such as 21 is fixed to a wall portion 22 of a Faraday cage room. Within the frame of this casing there is an opening 23 in this portion of the cage wall. The two hundred conductors (20×5×2) on the "right-hand" side of the casing lead via this opening to the equipment contained in the Faraday cage room. The two hundred conductors on the left-hand side of the casing form an electric connection leading to the outer world.

By utilizing the available components (coils and lead-through components) which are known in themselves, it will be possible to realize a lead-through filter which meets the necessary requirements.

I claim:

1. Apparatus for galvanically interconnecting one or more electric conductors, while preventing electromagnetic radiation from transferring energy between conductors thus interconnected, comprising:

a metal housing having a first side wall in which one or more first through connectors are mounted while being electrically insulated from said first side wall, and a second side wall in which one or more second through connectors are mounted while being electrically insulated from said second side wall;

each of said first through connectors being galvanically connected to a corresponding one of said second through connectors through a voltage-dependent $\pi$-filter section including a coil serially connected between the corresponding first and second through connectors;

an electrically conducting transverse partition being mounted within said housing between said first and second side walls;

the improvement being that each of said voltage-dependent π-filter sections is electrically connected to a lead-through component mounted in said partition in a manner to prevent electromagnetic radiation from leaking through said partition;

said lead-through component providing a first low-pass frequency-dependent π-filter section having a HF-inductance serially connected to said coil, said coil being located between said first sidewall and said transverse partition, and a capacitor included in a transverse branch of said frequency-dependent filter section;

said coil and said capacitor being dimensioned to provide a second low-pass frequency-dependent filter section;

said partition being circumferentially galvanically connected to said housing in a manner to prevent electromagnetic radiation from leaking from its one side to its other side and vice versa.

2. Apparatus as defined in claim 1, wherein between said electrically conducting transverse partition, hereinafter referred to as said first transverse partition, and said second sidewall there is mounted a second electrically conductive transverse partition wherein there are mounted a second set of lead-through components equal in number to the lead-through components mounted in said first transverse partition, the lead-through components of said second set being mounted in said second transverse partition in a manner to prevent electromagnetic radiation from leaking through said second transverse partition, said lead-through components of said second set each providing a third low-pass frequency dependent π-filter section having a second capacitor in a transverse filter branch and a HF-inductance serially connected to said coil, hereinafter referred to as a first coil, through a lead-through component mounted in said first partition and through a second coil located between said first and second partitions, said second capacitor being dimensioned to provide, with said second coil, a fourth low-pass frequency dependent filter section and said second partition being circumferentially galvanically connected to said housing in a manner to prevent electromagnetic radiation from leaking from its one side to its other side and vice versa.

3. Apparatus as defined in claim 2, wherein there is located between said second transverse partition and said second side wall, and connected to each of said second through connectors, a third coil connected in series to the longitudinal branch of said fourth low-pass frequency-dependent π-filter section through one of said lead-through components of said second set.

4. Apparatus as defined in claim 2, wherein said housing is provided with a removable cover wall having, on the side thereof which faces the interior of the housing, at locations close to where a transverse partition is situated in said housing, strips of a resilient conducting metal connected in an electrically conductive way to said side of said cover wall for assuring that when said cover wall is fixed to said housing, said strips will form a conducting and mechanically sealing engagement with the respective joining portions of said transverse partitions.

5. Apparatus as defined in claim 1, wherein each voltage-dependent π-filter section is provided with a gas discharge tube in the portion of said housing adjoining said first sidewall, each of said gas discharged tubes being galvanically connected on one side to a common ground wire made of a material with a relatively large conductivity.

6. Apparatus as defined in claim 3, wherein the self-induction of the third coil is about half the self-induction of the second coil of the fourth low-pass frequency-dependent filter section and about equal to the self-induction of the coil of the second frequency-dependent filter section.

* * * * *